(12) United States Patent
Joharapurkar et al.

(10) Patent No.: US 9,256,330 B2
(45) Date of Patent: Feb. 9, 2016

(54) CAPACITIVE TOUCH PANEL CONFIGURED TO SENSE BOTH ACTIVE AND PASSIVE INPUT WITH A SINGLE SENSOR

(71) Applicant: Qualcomm Technologies, Inc., San Diego, CA (US)

(72) Inventors: Ashutosh R. Joharapurkar, Bangalore (IN); Rajesh Tiruvuru, Nagalapuram (IN)

(73) Assignee: Qualcomm Technologies, Inc., San Diego, CA (US)

( * ) Notice: Subject to any disclaimer, the term of this patent is extended or adjusted under 35 U.S.C. 154(b) by 210 days.

(21) Appl. No.: 13/899,700

(22) Filed: May 22, 2013

(65) Prior Publication Data

US 2014/0347311 A1 Nov. 27, 2014

(51) Int. Cl.
*G06F 3/041* (2006.01)
*G06F 3/044* (2006.01)
*G06F 3/0354* (2013.01)

(52) U.S. Cl.
CPC ............ *G06F 3/044* (2013.01); *G06F 3/03545* (2013.01); *G06F 3/0416* (2013.01)

(58) Field of Classification Search
CPC .................................. G06F 3/041; G06F 3/044
USPC ................................................. 345/173–174
See application file for complete search history.

(56) References Cited

U.S. PATENT DOCUMENTS

| 8,350,813 | B2 | 1/2013 | Sato | |
|---|---|---|---|---|
| 2005/0184973 | A1* | 8/2005 | Lum et al. | 345/173 |
| 2010/0116560 | A1* | 5/2010 | Sato | 178/18.01 |
| 2010/0155153 | A1* | 6/2010 | Zachut | 178/18.03 |
| 2012/0327041 | A1* | 12/2012 | Harley et al. | 345/179 |

FOREIGN PATENT DOCUMENTS

CN 104182105 12/2014

* cited by examiner

*Primary Examiner* — Viet Pham
(74) *Attorney, Agent, or Firm* — Weaver Austin Villeneuve & Sampson LLP (57) ABSTRACT

A capacitive touch panel includes sense electrodes arranged next to one another and drive electrodes arranged next to one another across the sense electrodes. The drive electrodes and the sense electrodes define a coordinate system where each coordinate location comprises a capacitor formed at a junction between one of the drive electrodes and one of the sense electrodes via mutual capacitance between the electrodes. The drive electrodes are configured to receive a first signal from a driver coupled with the drive electrodes for powering the drive electrodes to sense passive input to the capacitive touch panel at each coordinate location. Passive input can also be sensed via self-capacitance of the capacitive touch panel sensors. The drive electrodes and the sense electrodes are configured to receive a second signal from an active stylus to sense active input to the capacitive touch panel at each coordinate location.

14 Claims, 11 Drawing Sheets

CAPACITIVE TOUCH PANEL CONFIGURED TO SENSE BOTH ACTIVE AND PASSIVE INPUT WITH A SINGLE SENSOR

BACKGROUND

A touch panel is a human machine interface (HMI) that allows an operator of an electronic device to provide input to the device using an instrument such as a finger, a stylus, and so forth. For example, the operator may use his or her fingers to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth. In other cases, the operator may use a stylus to provide commands via a touch panel.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electric field, measurable as a change in capacitance.

SUMMARY

A capacitive touch panel includes sense electrodes arranged next to one another and drive electrodes arranged next to one another across the sense electrodes. The drive electrodes and the sense electrodes define a coordinate system where each coordinate location comprises a capacitor formed at a junction between one of the drive electrodes and one of the sense electrodes via mutual capacitance between the electrodes. The drive electrodes are configured to receive a first signal from a driver coupled with the drive electrodes for powering the drive electrodes to sense passive input to the capacitive touch panel at each coordinate location. Passive input can also be sensed via self-capacitance of the capacitive touch panel sensors. The drive electrodes and the sense electrodes are configured to receive a second signal from an active stylus to sense active input to the capacitive touch panel at each coordinate location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
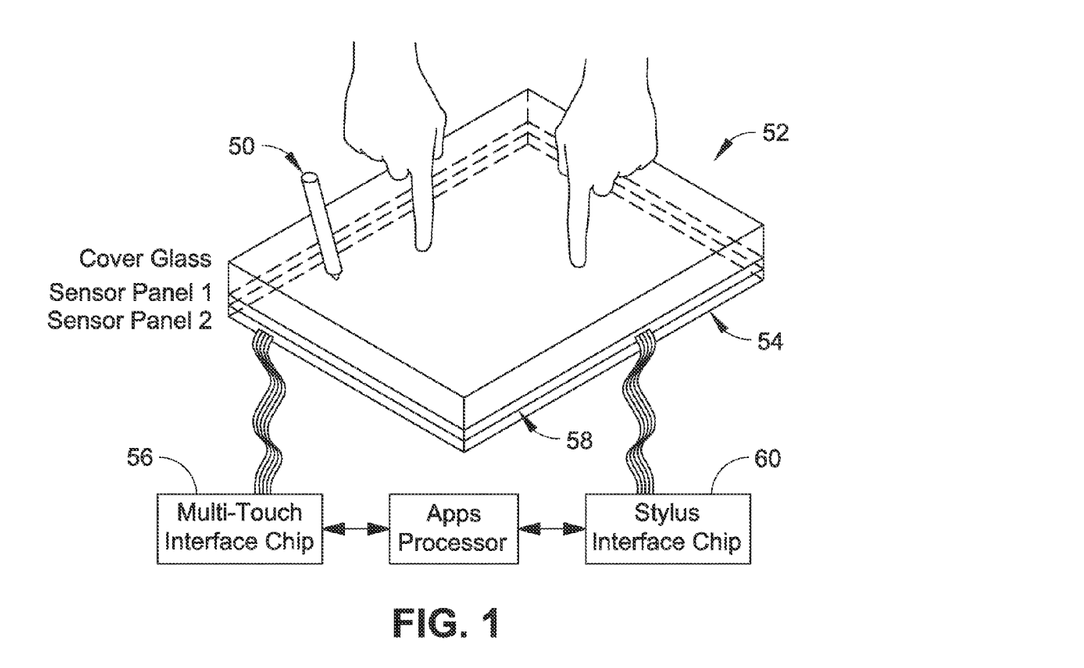
FIG. 1 is a diagrammatic illustration of a touch sensing device configured to sense both active and passive input, where the touch sensing device incorporates a capacitive touch panel with an associated multi-touch interface controller and another sensor panel with an associated stylus interface controller.
Figure 2:
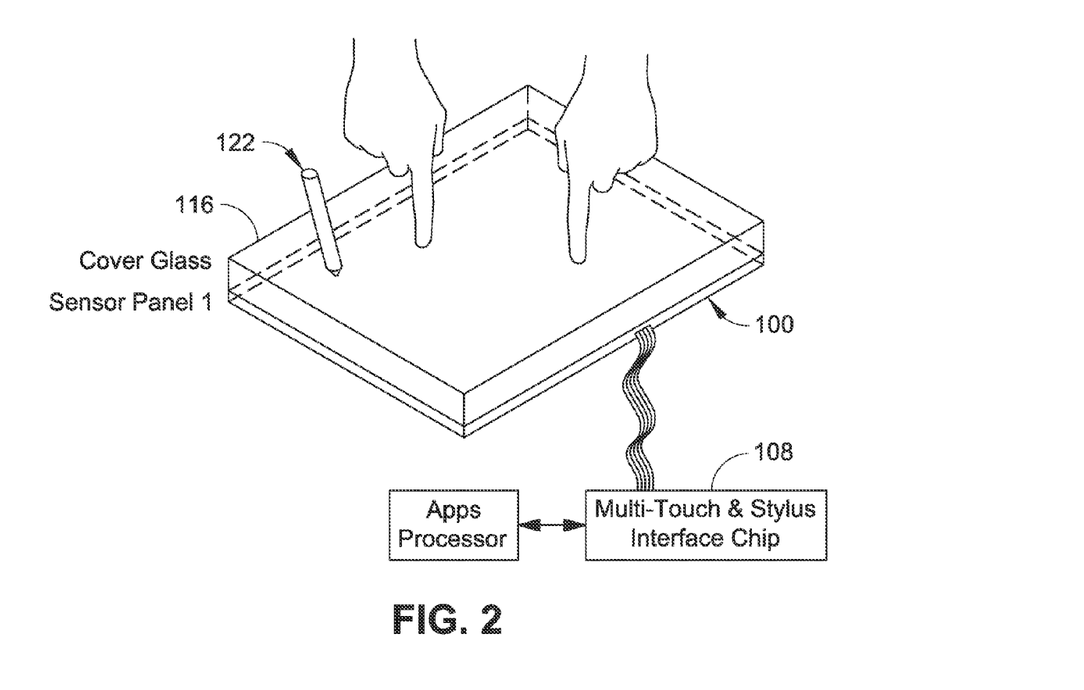
FIG. 2 is a diagrammatic illustration of a capacitive touch panel configured to sense both active and passive input with the same set of sensors in accordance with example embodiments of the present disclosure.

Cross-bar X and Y ITO patterns are typically used in mutual capacitance-based capacitive touch panels to sense inputs from instruments such as human fingers, passive styluses, and so forth. Referring to FIG. 1, it may be desirable to sense inputs from both the aforementioned instruments and another type of instrument, such as an active stylus 50. However, when the active stylus 50 is used with a touch sensing device 52 incorporating a capacitive touch panel 54, two separate sensors and touch controllers are typically included: the capacitive touch panel 54 with an associated multi-touch interface controller 56 for sensing finger or passive stylus inputs, and another sensor panel 58 (and typically another associated stylus interface controller 60) for sensing inputs from the active stylus 50.

Including two separate sensors (and possibly separate touch controllers) in one touch panel device can significantly increase the cost and complexity of the device. Accordingly, systems and techniques are provided for sensing both active and passive input with a single touch panel sensor. For example, the same set of sensors used for finger or passive stylus touch sensing is used to sense input from an active stylus. In embodiments of the disclosure, a single touch controller is used to control the sensor. This configuration can decrease the cost and complexity of the systems and techniques described (e.g., with respect to a touch panel having separate sensors and touch controllers). Further, the systems and techniques disclosed herein can support both finger and active stylus sensing simultaneously, or at least substantially simultaneously.

In embodiments of the disclosure, the systems and techniques described herein provide a high signal-to-noise (SNR) ratio for touch panel input. Better noise performance is achieved by using a narrow band front end for active stylus detection. For example, narrow band frequency response is achieved by multiplying an incoming signal from the active stylus by a signal having the same (or at least substantially the same) frequency and phase. As described, IQ demodulation on a touch panel controller such as a touch screen controller (TSC) is used to eliminate the phase shift from an active stylus. Further, narrow band demodulation/correlation is used for detection of various inputs, including but not necessarily limited to: inputs from human fingers, passive styluses, active styluses, and so forth. Further, in some embodiments, a high frequency carrier is used to send active stylus synchronization signals and/or indications of full-function stylus actions (e.g., button presses, pressure signals, and so forth) between an instrument such as an active stylus and the touch panel.

Example Implementations

Referring generally to FIGS. 2 through 12, example mutual capacitance Projected Capacitive Touch (PCT) panels 100 are described in accordance with example embodiments of the present disclosure. The capacitive touch panels 100 are configured to sense multiple inputs simultaneously, or at least substantially simultaneously. The capacitive touch panels 100 can be used to interface with electronic devices, including but not necessarily limited to: large touch panel products, all-in-one computers, mobile computing devices (e.g., hand-held portable computers, Personal Digital Assistants (PDAs), laptop computers, netbook computers, tablet computers, and so forth), mobile telephone devices (e.g., cellular telephones and smartphones), devices that include functionalities associated with smartphones and tablet computers (e.g., phablets), portable game devices, portable media players, multimedia devices, satellite navigation devices (e.g., Global Positioning System (GPS) navigation devices), e-book reader devices (eReaders), Smart Television (TV) devices, surface computing devices (e.g., table top computers), Personal Computer (PC) devices, as well as with other devices that employ touch-based human interfaces.

The capacitive touch panels 100 may comprise ITO touch panels that include drive electrodes 102, such as X-axis and/or Y-axis cross-bar ITO drive traces/tracks, arranged next to one another (e.g., along parallel tracks, generally parallel tracks, and so forth). The drive electrodes 102 are elongated (e.g., extending along a longitudinal axis). For example, each drive electrode 102 extends along an axis on a supporting surface, such as a substrate of a capacitive touch panel 100. The capacitive touch panels 100 also include sense electrodes 104, such as cross-bar X-axis and/or Y-axis ITO sensor traces/tracks, arranged next to one another across the drive electrodes 102 (e.g., along parallel tracks, generally parallel tracks, and so forth). The sense electrodes 104 are elongated (e.g., extending along a longitudinal axis). For instance, each sense electrode 104 extends along an axis on a supporting surface, such as a substrate of a capacitive touch panel 100. It should be noted that an ITO touch panel is provided by way of example only and is not meant to limit the present disclosure. In other embodiments, one or more other transparent materials (e.g., Antimony Tin Oxide (ATO)), semi-transparent materials, and/or non-transparent materials (e.g., copper) is used for a drive electrode 102 and/or a sense electrode 104 of a capacitive touch panel 100.

Figure 3:
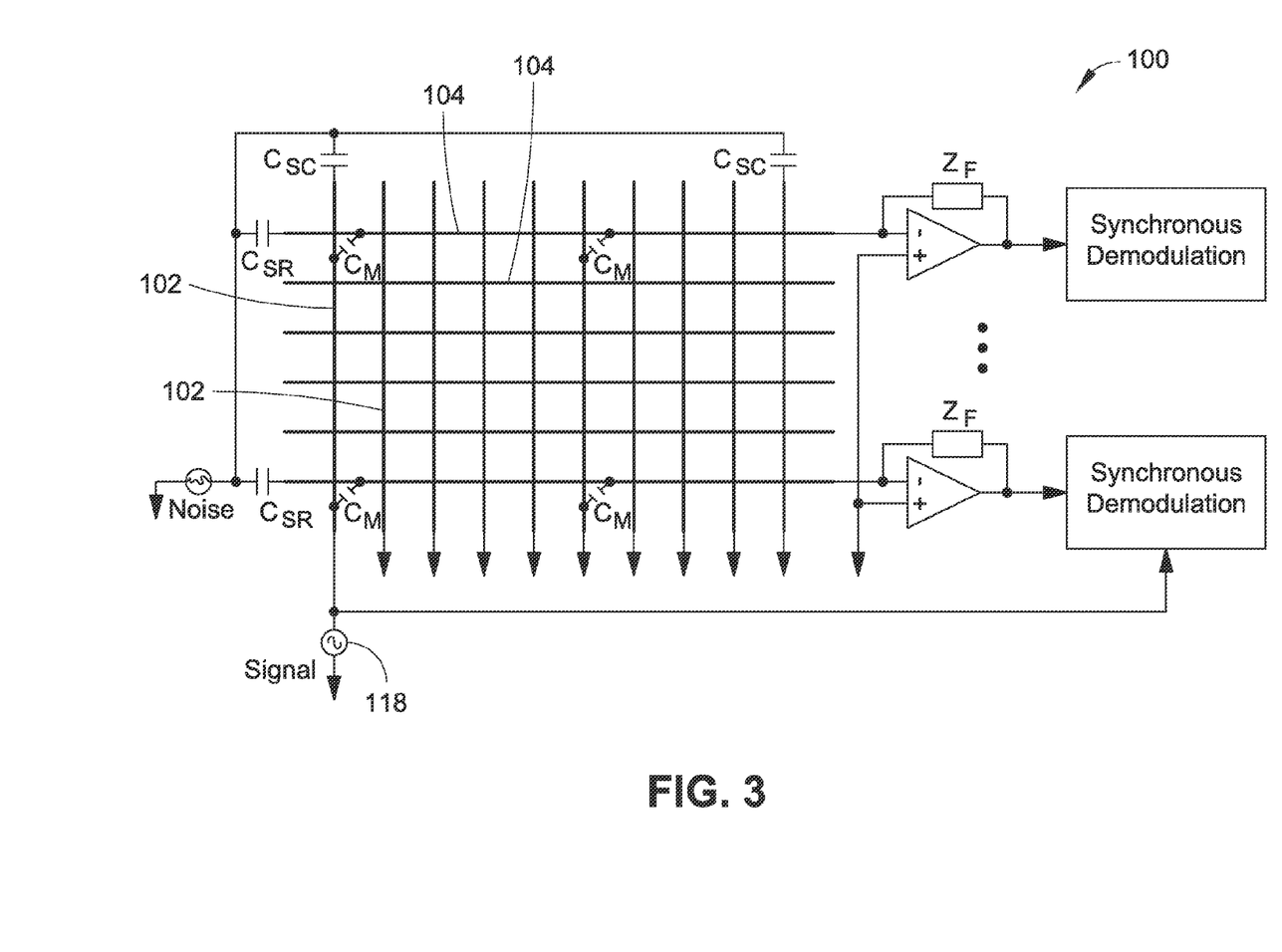
FIG. 3 is a partial schematic diagram of circuitry for a capacitive touch panel, such as the capacitive touch panel illustrated in FIG. 2, where the circuitry is configured to sense passive input in accordance with example embodiments of the present disclosure.

The drive electrodes 102 and the sense electrodes 104 define a coordinate system where each coordinate location (pixel) comprises a capacitor formed at each junction between one of the drive electrodes 102 and one of the sense electrodes 104. Thus, the drive electrodes 102 are configured to connect to one or more electrical circuits and/or electronic components (e.g., one or more drivers 106) to generate a local electric field at each capacitor. A change in the local electric field generated by an instrument (e.g., passive input from a finger or a stylus) at each capacitor formed at a drive electrode 102 and a sense electrode 104 causes a change (e.g., a decrease) in capacitance associated with a touch at the corresponding coordinate location. As shown in FIG. 3, the mutual capacitance ($C_M$) is capacitance that occurs between two charge-holding objects (e.g., conductors). In this instance, the mutual capacitance is the capacitance between the drive electrodes 102 and the sense electrodes 104 that comprise the capacitive touch panel 100 sensor. As described above, the drive electrodes 102 and the sense electrodes 104 comprise traces that represent the driving lines and corresponding sensing lines to detect a change in mutual capacitance due to a touch event performed over the surface of the touch panel. It should be noted that for the purposes of the present disclosure, the drive electrodes 102 represent the driving lines and the sense electrodes 104 represent the sensing lines in some implementations, and the drive electrodes 102 represent the sensing lines and the sense electrodes 104 represent the driving lines in other implementations.

It should also be noted that capacitive touch panels 100 as described herein are not limited to mutual capacitance sensing. For example, passive input (e.g., from a finger or a stylus) can also be sensed via self-capacitance of one or more of the capacitive touch panel 100 sensors. As shown, self-capacitance is the capacitance associated with the respective column ($C_{SC}$) and the respective row ($C_{SR}$) and represents the amount of electrical charge to be furnished to the respective column or row to raise its electrical potential by one unit (e.g., by one volt, and so on). In embodiments of the disclosure, more than one touch can be sensed at differing coordinate locations simultaneously (or at least substantially simultaneously). In some embodiments, the drive electrodes 102 are driven by one or more of the drivers 106 in parallel, e.g., where a set of different signals are provided to the drive electrodes 102. In other embodiments, the drive electrodes 102 are driven by one or more of the drivers 106 in series, e.g., where each drive electrode 102 or subset of drive electrodes 102 is driven one at a time.

Figure 12:
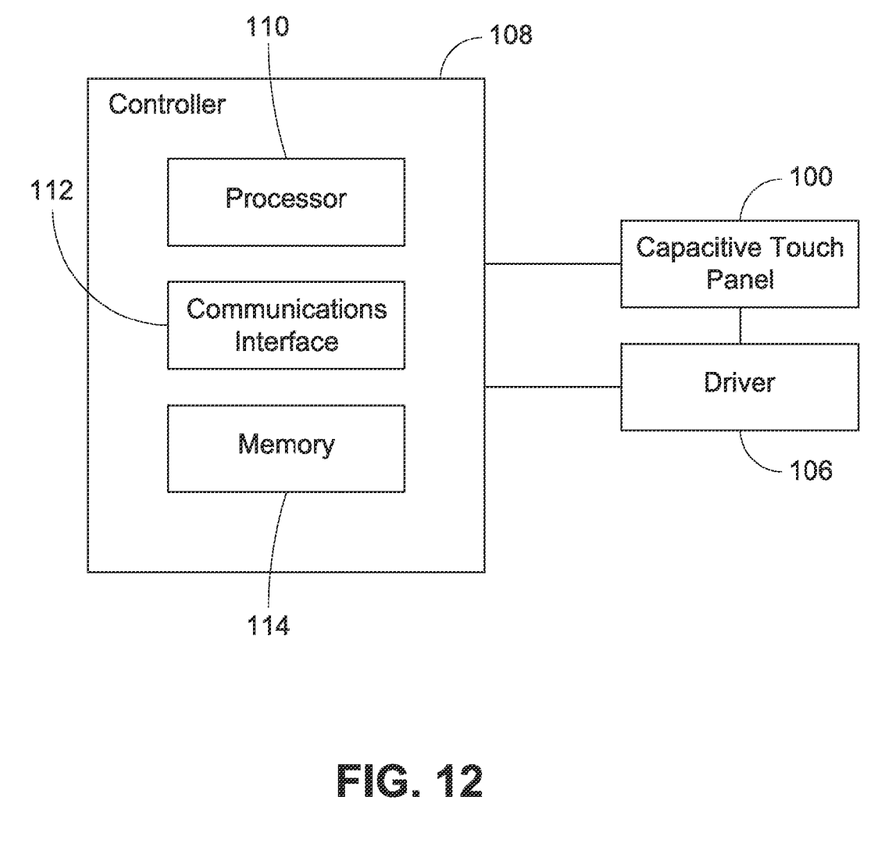
FIG. 12 is a block diagram illustrating a system including a capacitive touch panel configured to sense both active and passive input with the same set of sensors in accordance with example embodiments of the present disclosure.

The drivers 106 may comprise, for example, one or more digitally controlled oscillators. In some embodiments, the drivers 106 are included with a capacitive touch panel assembly (e.g., as part of a capacitive touch panel controller configured for use with a touch screen assembly, and so forth). In other embodiments, a capacitive touch panel 100 is coupled with one or more drivers 106, and a controller 108 is used to control the capacitive touch panel 100 and/or the drivers 106. As shown in FIG. 12, the controller 108 includes a processor 110, a communications interface 112, and a memory 114. The processor 110 provides processing functionality for the controller 108 and may include any number of processors, microcontrollers, or other processing systems and resident or external memory for storing data and other information accessed or generated by the controller 108.

The processor 110 may execute one or more software programs, which implement techniques described herein. The processor 110 is not limited by the materials from which it is formed or the processing mechanisms employed therein, and as such, may be implemented via semiconductor(s) and/or transistors (e.g., using electronic Integrated Circuit (IC) components), and so forth. The communications interface 112 is operatively configured to communicate with components of the touch panel. For example, the communications interface 112 can be configured to control drive electrodes 102 of the touch panel, receive inputs from sense electrodes 104 and/or drive electrodes 102 of the touch panel, and so forth. The communications interface 112 is also communicatively coupled with the processor 110 (e.g., for communicating inputs from the sense electrodes of the capacitive touch panel 100 to the processor 110).

The memory 114 is an example of tangible computer-readable media that provides storage functionality to store various data associated with operation of the controller 108, such as software programs and/or code segments, or other data to instruct the processor 110 and possibly other components of the controller 108 to perform the steps described herein. Although a single memory 114 is shown, a wide variety of types and combinations of memory may be employed. The memory 114 may be integral with the processor 110, may comprise stand-alone memory, or may be a combination of both. The memory 114 may include, but is not necessarily limited to: removable and non-removable memory components, such as Random Access Memory (RAM), Read-Only Memory (ROM), Flash memory (e.g., a Secure Digital (SD) memory card, a mini-SD memory card, and/or a micro-SD memory card), magnetic memory, optical memory, Universal Serial Bus (USB) memory devices, and so forth. In embodiments, the controller 108 and/or memory 114 may include removable Integrated Circuit Card (ICC) memory, such as memory provided by a Subscriber Identity Module (SIM) card, a Universal Subscriber Identity Module (USIM) card, a Universal Integrated Circuit Card (UICC), and so on.

The sense electrodes 104 are electrically insulated from the drive electrodes 102 (e.g., using a dielectric layer, and so forth). For example, the sense electrodes 104 are provided on one substrate (e.g., comprising a sense layer disposed on a glass substrate), and the drive electrodes 102 are provided on a separate substrate (e.g., comprising a drive layer disposed on another substrate). In this two-layer configuration, the sense layer can be disposed above the drive layer (e.g., with respect to a touch surface). For example, the sense layer is positioned closer to a touch surface than the drive layer. However, this configuration is provided by way of example only and is not meant to be restrictive of the present disclosure. Thus, other configurations can be provided where the drive layer is positioned closer to a touch surface than the sense layer, and/or where the sense layer and the drive layer comprise the same layer. For instance, in a 1.5-layer embodiment (e.g., where the drive layer and the sense layer are included on the same layer but physically separated from one another), one or more jumpers are used to connect portions of a drive electrode 102 together. Similarly, jumpers can be used to connect portions of a sense electrode 104 together. In other embodiments, the drive layer and the sense layer comprise the same layer (e.g., in a single-layer sensor configuration).

One or more capacitive touch panels 100 can be included with a touch screen assembly. The touch screen assembly includes a display screen, such as a liquid crystal display (LCD) screen, where the sense layer and the drive layer are sandwiched between the LCD screen and a bonding layer, with a protective cover (e.g., cover glass 116) attached thereto. The cover glass 116 may include a protective coating, an anti-reflective coating, and so forth. The cover glass 116 comprises a touch surface, upon which an operator can use one or more fingers, a stylus, and so forth to input commands to the touch screen assembly. The commands can be used to manipulate graphics displayed by, for example, the LCD screen. Further, the commands can be used as input to an electronic device connected to a capacitive touch panel 100, such as a multimedia device or another electronic device (e.g., as previously described).

Referring now to FIG. 3, a signal (e.g., a sine signal 118) is transmitted through one or more of the drive electrodes 102 and sensed through one or more of the sense electrodes 104. In some embodiments, the complete operation of the drive electrodes 102 and the sense electrodes 104 is furnished using the same clock on an IC chip. In embodiments, providing a signal to a drive electrode 102 is synchronized with sensing a signal from a sense electrode 104. In this manner, delays through the capacitive touch panel 100 are known and compensated for. In-phase demodulation/correlation is achieved using, for instance, multiplication by the sine signal 118. The sine signal 118 can be supplied to the drive electrodes 102 using one or more of the drivers 106. However, sine signal 118 is provided by way of example only and is not meant to limit the present disclosure. In other embodiments, different signals are supplied to one or more of the drive electrodes 104. It should be noted that a signal sensed through one of more of the sense electrodes 104 can be further processed using additional circuitry not shown in FIG. 3. For example, signals from the sense electrodes 104 can be mixed, supplied to a multiplexer, filtered (e.g., using a narrow-band filter), and so forth.

Figure 4:
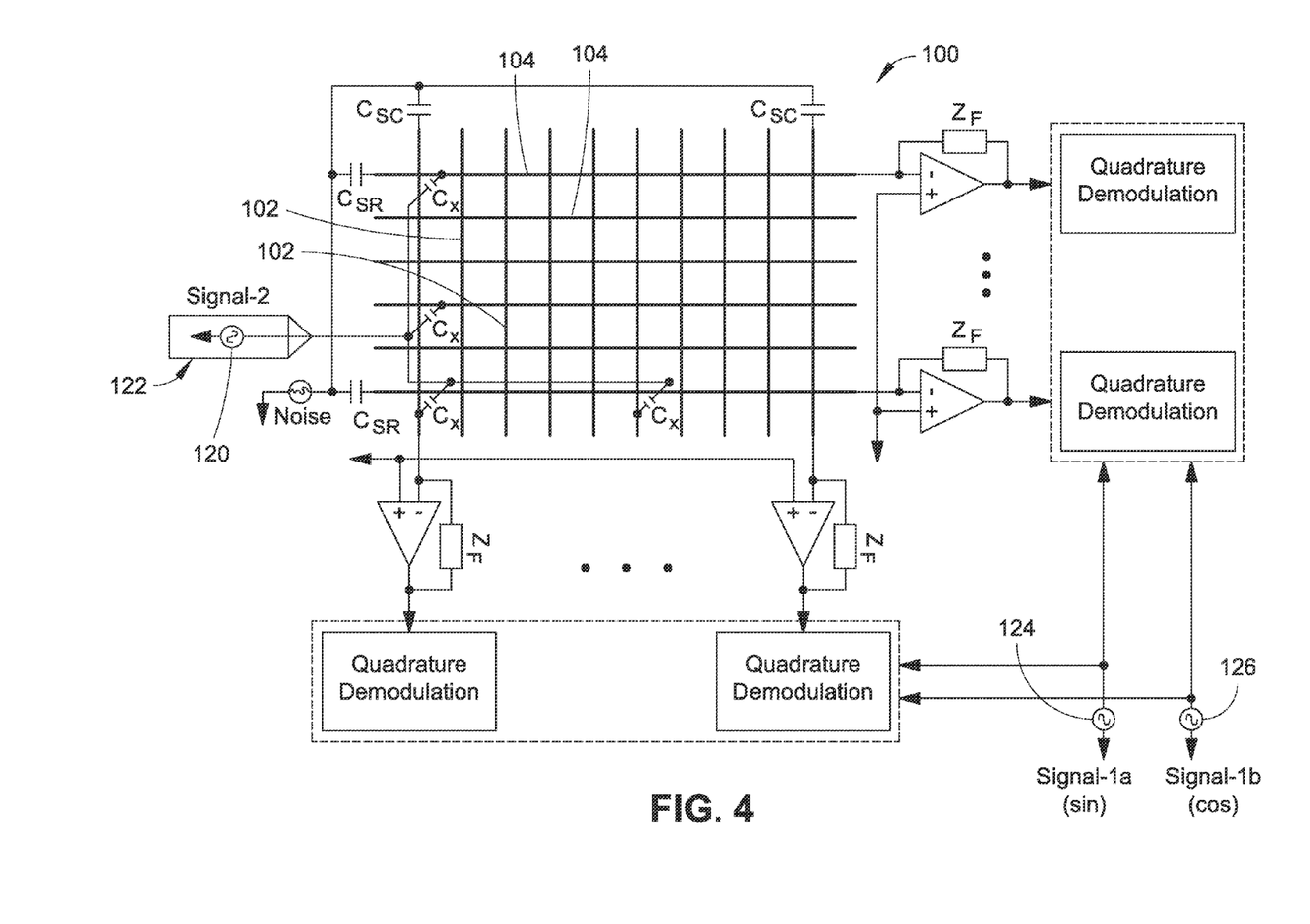
FIG. 4 is another partial schematic diagram of circuitry for a capacitive touch panel, such as the capacitive touch panel illustrated in FIG. 2, where the circuitry is configured to sense active input in accordance with example embodiments of the present disclosure.

Referring now to FIG. 4, a signal (e.g., a sine signal 120) is transmitted from an active stylus 122 and sensed using one or more of the drive electrodes 102 or the sense electrodes 104.

In this configuration, the delay through the capacitive touch panel 100 can change depending upon the position of the active stylus 122. The starting point of the signal on the stylus 122 can be different from the starting point of the signal in the controller 108 used for correlation. This can result in phase difference between the signal in the stylus 122 and the signal in the controller 108 used for correlation. Detecting a zero cross condition (e.g., where the sign changes for a function representing a signal received from the active stylus 122) for synchronization can be difficult when the received signal is of small amplitude. Further, comparator delay can cause a corresponding phase shift in the received signal with respect to the transmitted signal. Additionally, the controller 108 and the active stylus 122 may have different clocks, resulting in different signal frequencies of the controller 108 and the active stylus 122.

To eliminate the need for phase synchronization between the signal transmitted from the active stylus 122 and the signal used for correlation by the controller 108, IQ demodulation is used. I and Q demodulation/correlation is achieved by multiplication by a sine signal 124 and a cosine signal 126 at the same time, or at least substantially the same time, to avoid delay change of the signal. To determine one or more coordinate locations (e.g., X-Y coordinates) for inputs to the capacitive touch panel 100, the demodulation/correlation is performed on both the transmit channels and the receive channels (e.g., on both the drive electrodes 102 and sense electrodes 104). The demodulation on the transmit channels and the receive channels can be performed at the same time or sequentially. The signal sensed through one or more of the drive electrodes 102 and/or the sense electrodes 104 can be further processed using additional circuitry not shown in FIG. 4. For example, signals from the drive electrodes 102 and/or the sense electrodes 104 can be mixed, supplied to a multiplexer, filtered using a narrow-band filter, and so forth. In some embodiments, two or more correlators are multiplexed to reduce circuitry area, cost, and so forth.

For a capacitive touch panel 100 with M drive electrodes 102 and N sense electrodes 104, where the correlation time is represented by T, the time required for stylus detection correlation is:

$$T*(2*(M+N))$$

It should be noted that during finger detection, the active stylus 122 may be sensed as a small finger. This effect can reinforce the ability of the capacitive touch panel 100 to determine the position of the active stylus 122 (e.g., by combining input from finger detection with input from active stylus detection). It should also be noted that sine signal 120, sine signal 124, and cosine signal 126 are provided by way of example only and are not meant to limit the present disclosure. In other embodiments, different phases are provided to, for example, a correlation digital-to-analog (DAC) converter. Further, the techniques disclosed herein are not limited to out-of-band operation. In some embodiments, in-band operation of the active stylus 122 with respect to the controller 108 is used. For example, code division multiple access (CDMA) techniques are used to provide in-band operation of the active stylus 122 with respect to the touch panel controller 100.

Figure 5A:
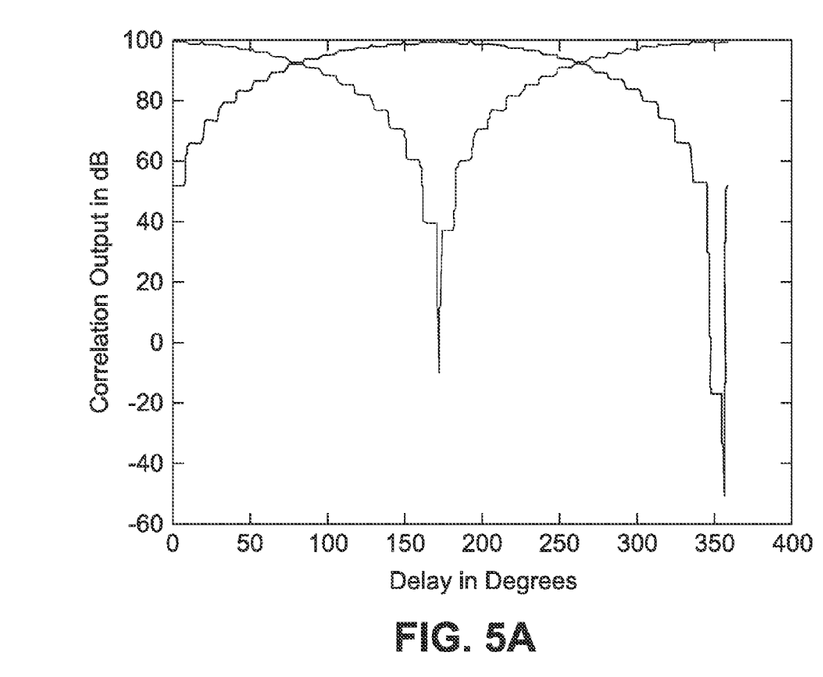
FIG. 5A is a graph illustrating I and Q demodulated outputs of a signal received by a touch panel controller from an active stylus in accordance with an example embodiment of the present disclosure.
Figure 5B:
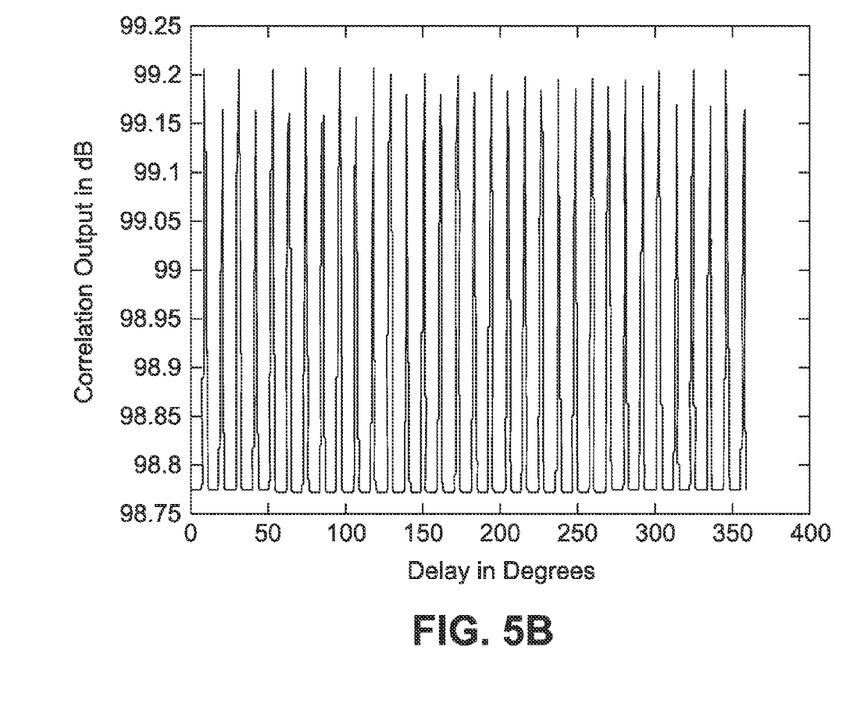
FIG. 5B is a graph illustrating the combined IQ demodulated output of the I and Q demodulated outputs shown in FIG. 5A.
Figure 6:
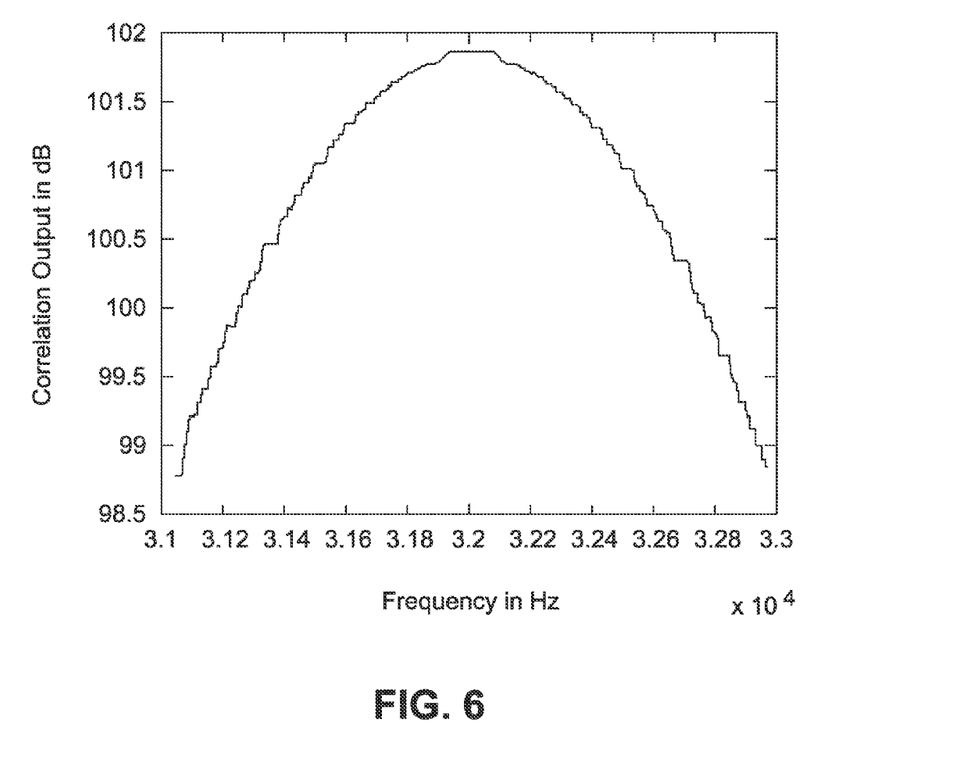
FIG. 6 is a graph illustrating the effect of changes in signal frequency on correlation output for a signal received by a touch panel controller from an active stylus in accordance with an example embodiment of the present disclosure.

With reference to FIGS. 5A through 6, the correlation output of IQ demodulation on an incoming thirty-two kilohertz (32 kHz) square wave signal is shown. Referring to FIG. 5A, I and Q demodulated outputs show the effect of delays on a signal transmitted from the active stylus 122 with a frequency difference of approximately three percent (3%) between the clock of the active stylus 122 and the clock of the controller 108. FIG. 5B shows a combined IQ demodulated output of the I and Q demodulated outputs shown in FIG. 5A. It should be noted that while three percent (3%) accuracy is depicted in FIGS. 5A and 5B, this accuracy is provided by way of example only and is not meant to limit the present disclosure. In other embodiments different accuracies are used, including but not necessarily limited to: four percent (4%) accuracy, five percent (5%) accuracy, six percent (6%) accuracy, and so forth. FIG. 6 represents the effect of changes in signal frequency on correlation output. As shown, the reduction in the SNR ratio of the signal received from the active stylus 122 is limited to approximately three decibels (3 dB) when the signal transmitted from the active stylus 122 and the demodulation/correlation signal generated by the controller 108 are within approximately three percent (3%) accuracy of one another.

In some embodiments, a desired accuracy between the clock of the active stylus 122 and the clock of the controller 108 is achieved using one or more devices that generate stable reference frequencies, including but not necessarily limited to: a crystal oscillator, a microelectromechanical system (MEMS) oscillator, and so forth. For example, one or more of the active stylus 122 or the controller 108 can implement a clock using a crystal oscillator. In some embodiments, the active stylus 122 includes a high voltage driver that continuously outputs the sine signal 120 to the capacitive touch panel 100. In this mode, stylus detection demodulation/correlation timing synchronization between the stylus 122 and the controller 108 is not required. In some embodiments, the controller 108 avoids the frequency of the sine signal 120 for finger detection (e.g., to reduce interference from detection of the active stylus 122 with the detection of passive input). For example, the frequency of the sine signal 118 is different from the frequency of the sine signal 120.

Figure 7:
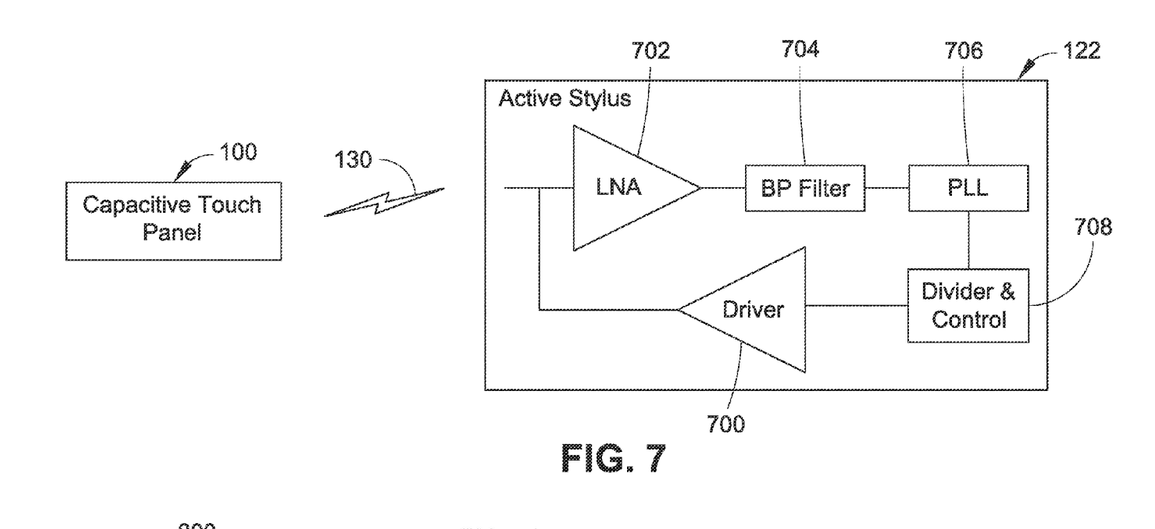
FIG. 7 is a block diagram illustrating circuitry for an active stylus configured to achieve synchronization between the active stylus and a touch panel, such as the capacitive touch panel illustrated in FIG. 2, in accordance with example embodiments of the present disclosure.

Referring now to FIG. 7, in some embodiments the controller 108 is configured to transmit a signal 130 through one or more transmit channels or receive channels of the capacitive touch panel 100 (e.g., through both the drive electrodes 102 and the sense electrodes 104). The signal 130 transmitted through the transmit channels and/or the receive channels has one or more characteristics different from the sine signal 118. For instance, the signal 130 comprises a high speed burst transmitted at a higher frequency than the sine signal 118 used for finger detection. The active stylus 122 is configured to lock onto the clock frequency of the signal 130 transmitted by the capacitive touch panel 100. In the configuration shown in FIG. 7, the active stylus 122 includes a driver 700 coupled with a low noise amplifier (LNA) 702, a band-pass (BP) filter 704, a phase-locked loop (PLL) 706, and a divider and control module 708. The BP filter 704 is configured to reject frequencies other than the frequency (or frequencies) of the signal 130 transmitted by the capacitive touch panel 100 (e.g., to avoid accidental activation of the active stylus 122). The PLL 706 is configured to lock onto the incoming signal 130.

After the PLL 706 has locked onto the incoming signal 130 (e.g., after a delay), the driver 700 furnishes a signal (e.g., a high voltage signal, such as the sine signal 120) to the capacitive touch panel 100. The sine signal 120 can be transmitted at a predetermined division of the acquired clock frequency (e.g., at a lower frequency than the frequency of the signal 130). In embodiments of the disclosure, a charge pump allows for injection of the sine signal 120 at a higher voltage. However, the sine signal 120 is provided by way of example only and is not meant to limit the present disclosure. In other embodiments, the signal transmitted to the capacitive touch panel 100 by the active stylus 122 is a square wave. In embodiments of the disclosure, the driver 700 transmits the sine signal 120 longer than the correlation time (e.g., in order to ensure that the correlation is governed by the timing on the controller 108). Further, the correlation timing can be configured so that the accuracy between the clock of the active stylus 122 and the clock of the controller 108 is approximately three percent (3%), four percent (4%), five percent (5%), six percent (6%), and so forth (e.g., as previously described).

In some embodiments, the active stylus 122 is powered using wireless energy transmission from the capacitive touch panel 100. For example, the active stylus 122 is powered using direct induction, resonant magnetic induction, and so forth. In other embodiments, the active stylus 122 is powered using one or more rechargeable batteries included with the active stylus 122. However, these power sources are provided by way of example only and are not meant to limit the present disclosure. In other embodiments, the active stylus 122 is powered using another type of electrical power, such as a wired connection configured to transmit power from the capacitive touch panel 100 to the active stylus 122.

Figure 8:
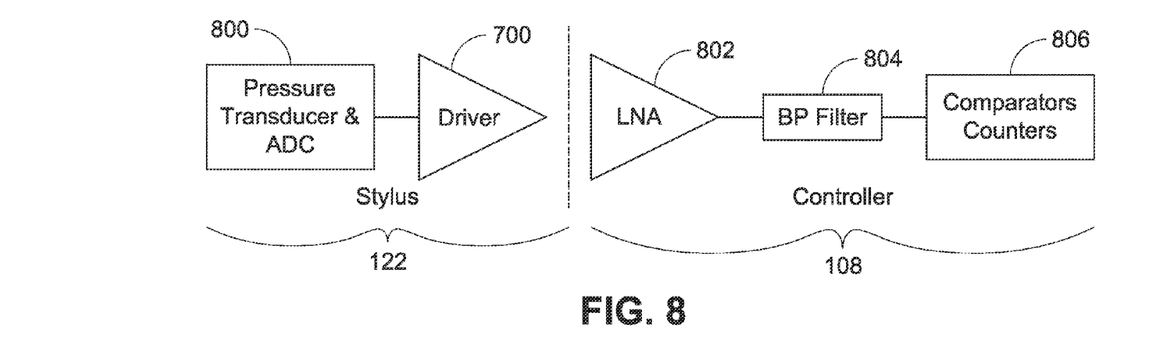
FIG. 8 is a block diagram illustrating circuitry for an active stylus used to transmit pressure and/or button-press information to a touch panel, and circuitry for a touch panel used to receive the information transmitted from the active stylus in accordance with example embodiments of the present disclosure.
Figure 9:
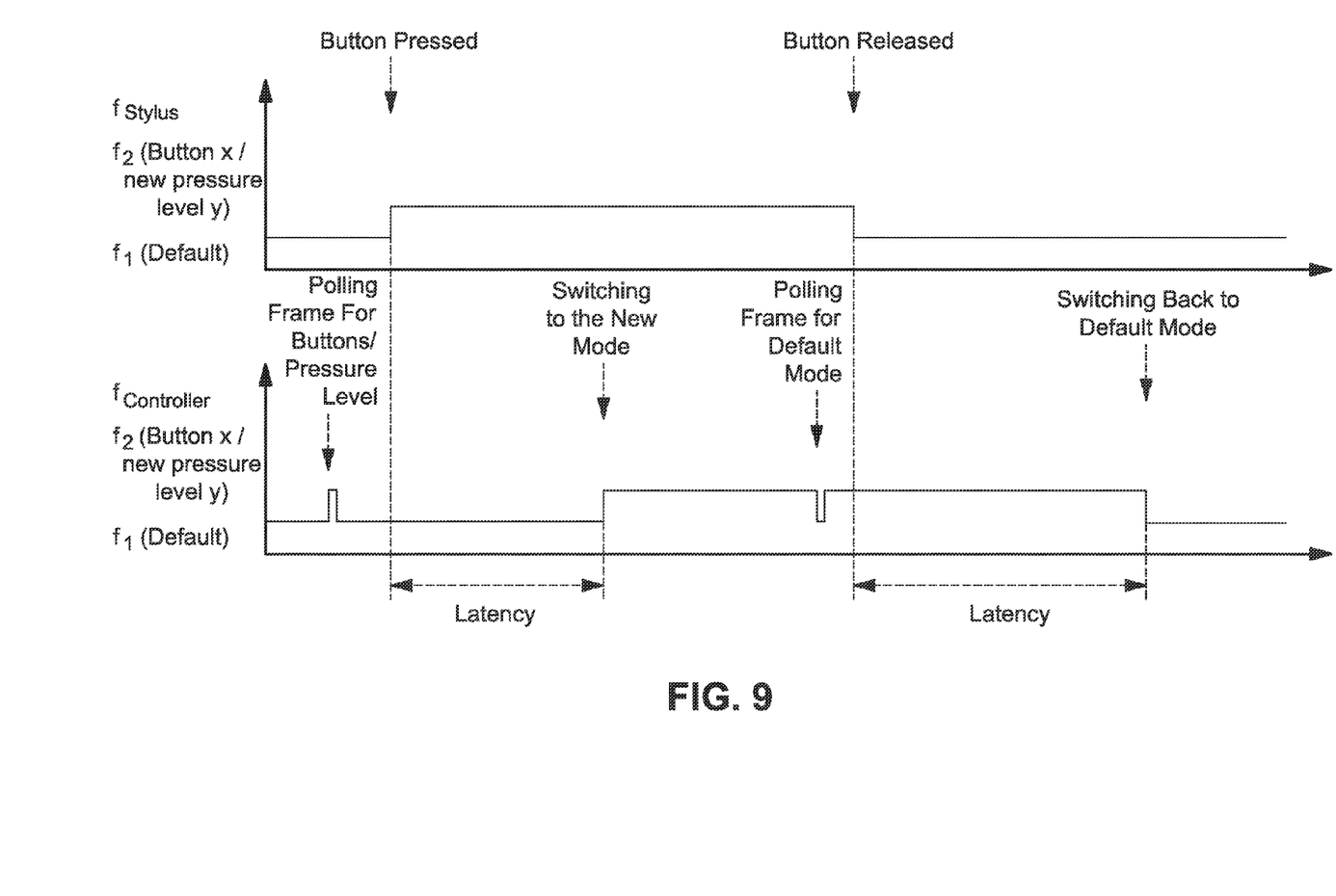
FIG. 9 is a timing diagram illustrating another technique for sensing the position of an active stylus as well as an indication of pressure exerted on the tip of the stylus and/or the press of a button on the active stylus using a capacitive touch panel configured to sense both active and passive input with the same set of sensors in accordance with example embodiments of the present disclosure.

Referring now to FIG. 8, in some embodiments, the active stylus 122 includes a pressure transducer 800 configured to detect pressure exerted on a tip of the active stylus 122 (e.g., by an operator). Synchronization is furnished between the controller 108 and the active stylus 122 for receiving pressure information (e.g., pressure sensitivity measurements). For example, in some embodiments synchronization between the controller 108 and the active stylus 122 is achieved during the PLL lock phase described with reference to FIG. 7. In other embodiments (e.g., when an oscillator and/or another device that generates a stable reference frequency is used), synchronization is achieved using an additional mode similar to the PLL lock mode described with reference to FIG. 7. For example, the controller 108 transmits a signal through one or more transmit channels or receive channels of the capacitive touch panel 100 (e.g., through both the drive electrodes 102 and the sense electrodes 104). In some embodiments, the active stylus 122 is configured to lock onto the clock frequency of the signal using a PLL. In other embodiments, the active stylus 122 implements correlation at the signal frequency (e.g., when the clock frequencies are within a desired accuracy of one another). In some embodiments, the frequency of the sine signal 120 from the active stylus 122 is used for the correlation. In this configuration, correlation detects the incoming signal from the active stylus 122 for synchronization.

An analog-to-digital converter (ADC) on the active stylus 122 converts an analog signal from the pressure transducer 800 to a digital signal, which is transmitted via, for instance, the driver 700 to the capacitive touch panel 100. In this manner, pressure information is conveyed to the controller 108. In some embodiments, the signal representing the pressure information has one or more characteristics different from the sine signal 118, the sine signal 120, and/or the signal 130. For instance, the signal is transmitted at the frequency of the PLL 706 (e.g., as described with reference to FIG. 7). In embodiments of the disclosure, one or more characteristics of a signal transmitting pressure information are representative of the pressure information. For example, a representative signal is transmitted for a length of time proportional to the pressure exerted on the tip of the active stylus 122. This implementation can provide greater immunity to noise.

The controller 108 of the capacitive touch screen 100 includes a low noise amplifier (LNA) 802 coupled with a band-pass (BP) filter 804 and one or more comparators 806. The receive channels can be multiplexed into the circuitry shown in FIG. 8. In some embodiments, only the receive channel with the highest signal detected during active stylus detection (e.g., a sense electrode 104 close to the active stylus 122) is used for receiving pressure information. The BP filter 804 is used to provide a narrowband response (e.g., rejecting frequencies other than the frequency (or frequencies) of a pressure sensitivity signal transmitted by the active stylus 122 to the capacitive touch panel 100). In some embodiments one or more counters are used to count pulses received at the desired frequency. For example, a counter detects up and/or down threshold crossings rather than using only an up and down comparator. In embodiments of the disclosure, this configuration provides additional noise immunity.

It should be noted that transmission of pressure information is provided by way of example only and is not meant to limit the present disclosure. In some embodiments, the active stylus 122 is configured to transmit additional information in addition to (or in place of) the pressure information described. For example, information indicative of one or more inputs to the active stylus 122, such as a button press, is transmitted from the driver 700 to the capacitive touch panel 100. In embodiments of the disclosure, one or more characteristics of the signal are representative of button press input. For example, a signal is transmitted for a length of time representative of the press of a particular button on the active stylus 122. As previously described, the receive channel with the highest signal detected during active stylus detection (e.g., a sense electrode 104 close to the active stylus 122) can be used for receiving the button press information. In embodiments of the disclosure, the signal from the active stylus 122 is transmitted for a length of time covering at least the demodulation time.

Referring now to FIGS. 9 through 12, the active stylus 122 can be configured to change its output frequency when a button on the active stylus 122 is pressed, pressure exerted on a tip of the active stylus 122 changes, and so forth. For example, a unique frequency (or set of frequencies) in addition to a default frequency (or set of frequencies) for stylus detection is assigned to each signal corresponding to a button press and/or a pressure level for the active stylus 122. The controller 108 of the capacitive touch panel 100 uses a polling scheme to periodically sense for one or more frequencies associated with stylus detection, button input (e.g., a button press or button release), and/or another type of input, such as pressure information. For example, a polling frame corresponding to a particular frequency or set of frequencies is used to change the demodulating carrier frequency appropriately while sensing for input from the active stylus 122.

Depending on the functionality of a particular button with respect to a particular application, the controller 108 can switch to a button sensing mode, report that a button was pressed, and so forth. Then, the controller 108 can revert to a pen/stylus sensing mode using the same polling technique (e.g., polling for a default frequency associated with stylus detection). Further, in some embodiments, button support is provided by adding another burst for button detection after pressure information has been transmitted to the capacitive touch panel 100. It should also be noted that the systems and techniques described herein are not limited to use with a single stylus. Thus, multiple active styluses 122 can be used in accordance with the present disclosure.

Figure 10:
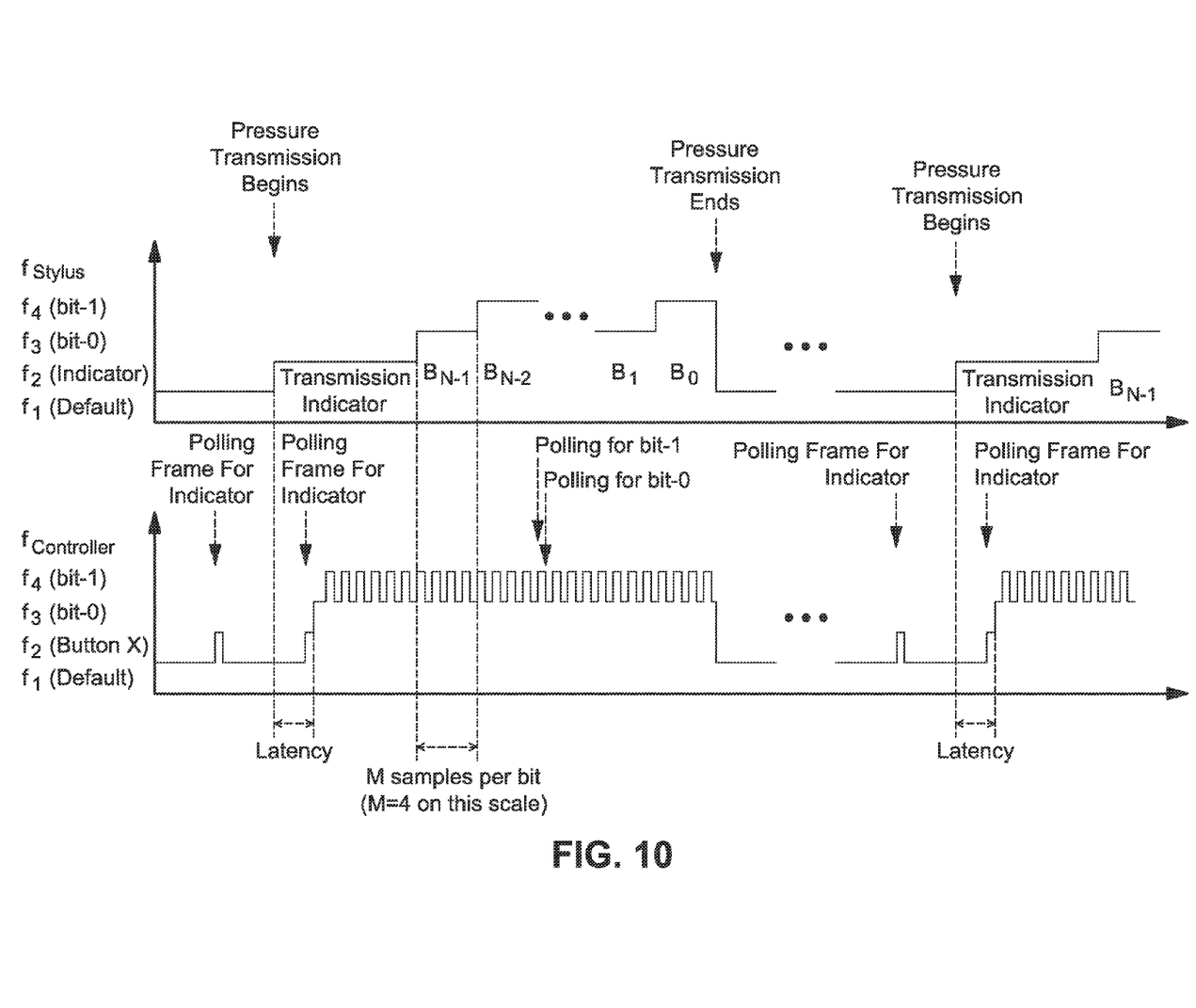
FIG. 10 is a timing diagram illustrating another technique for sensing the position of an active stylus as well as an indication of pressure exerted on the tip of the stylus and/or the press of a button on the active stylus using a capacitive touch panel configured to sense both active and passive input with the same set of sensors in accordance with example embodiments of the present disclosure.
Figure 11:
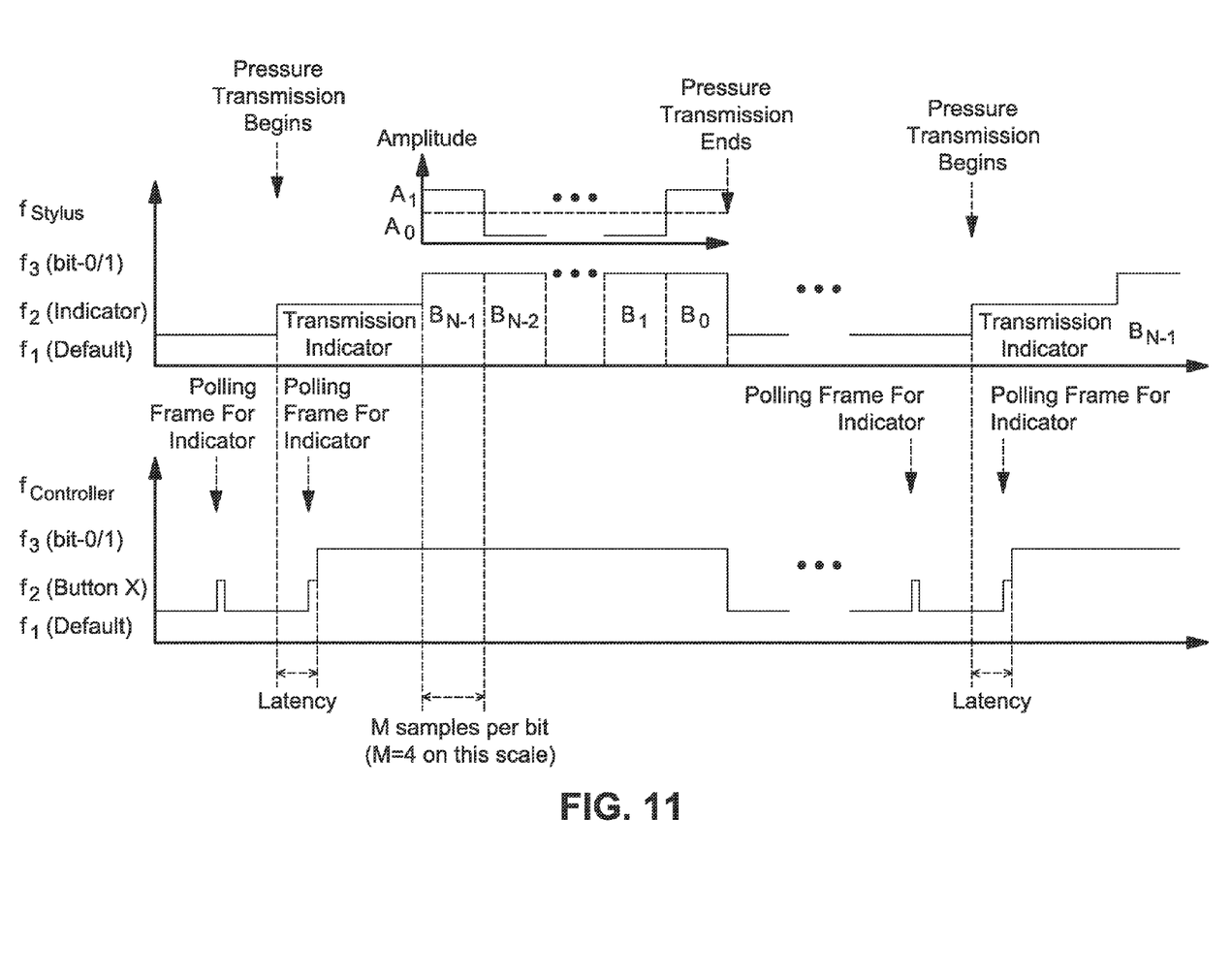
FIG. 11 is a timing diagram illustrating another technique for sensing the position of an active stylus as well as an indication of pressure exerted on the tip of the stylus and/or the press of a button on the active stylus using a capacitive touch panel configured to sense both active and passive input with the same set of sensors in accordance with example embodiments of the present disclosure.

In some embodiments, the active stylus 122 is an output-only device. For example, the active stylus 122 transmits one or more signals to the capacitive touch panel 100, and the controller 108 synchronizes itself with the active stylus 122. In some embodiments, digital output bits from a pressure transducer (e.g., eight-bit output from the pressure transducer 800 described with reference to FIG. 8) are used to modulate the frequency and/or amplitude of the carrier for a higher transmission rate and/or a lower number of frequencies (e.g., with respect to a technique where a pressure level is used to modulate the frequency of the carrier). As shown in FIG. 10, the frequency of the carrier signal is modulated using digital output bits from a pressure transducer. As shown in FIG. 11, the frequency and amplitude of the carrier signal is modulated using digital output bits from a pressure transducer. When capacitance measurement precision is the parameter of interest in these polling frames, the frames can be shorter in time with respect to an active stylus position sensing frame (e.g., as previously described), which, in turn, can be shorter than a mutual-capacitance based finger position sensing frame (e.g., as previously described). In this manner, the overall frame rate for the capacitive touch panel 100 may not be significantly affected for finger and active stylus detection using this technique.

As shown, the bit width of signals transmitted from the active stylus 122 to the capacitive touch panel 100 is large enough so that a number of samples are acquired for each bit. In this manner, a transmitted bit can change while a sample is acquired, there can be a non-zero frequency difference between a transmit channel and a receive channel, and/or enough samples generate a detection threshold for amplitude modulation.

In embodiments of the disclosure, the active stylus 122 transmits output bits from the pressure transducer 800 periodically (e.g., in a sequential manner). The transmission can be preceded by an indicator, which the controller 108 can sense while polling to determine when the active stylus 122 is transmitting. In this manner, when the controller 108 senses the indicator, the controller 108 begins to sample the bits. Then, until the indicator ends, the controller 108 will sense a zero (0) demodulator output. In this manner, the controller 108 can poll for the bits for a particular (e.g., precise) length of time without requiring another indicator from the active stylus 122 to end the receiving cycle. Further, because the bits modulate the frequency of the carrier, the controller senses for both frequencies (e.g., representative of zero's and one's) a number of times in each bit period to acquire the bit samples. Then, with a sufficient number of samples, the first and last samples of each bit can be dropped (e.g., to avoid potential bit transitions in the middle of an acquisition, as well as timing deviation due to a non-zero difference between the transmit and receive frequencies).

In another technique, the output of the active stylus 122 has the amplitude of a single frequency modulated by the bits. In this manner, the controller 108 does not necessarily poll for two different frequencies for each bit sample. After a sufficient number of samples are acquired, the average of the samples can be used to determine an optimal threshold for the comparator that detects the transmitted bits.

Example Process

Figure 13:
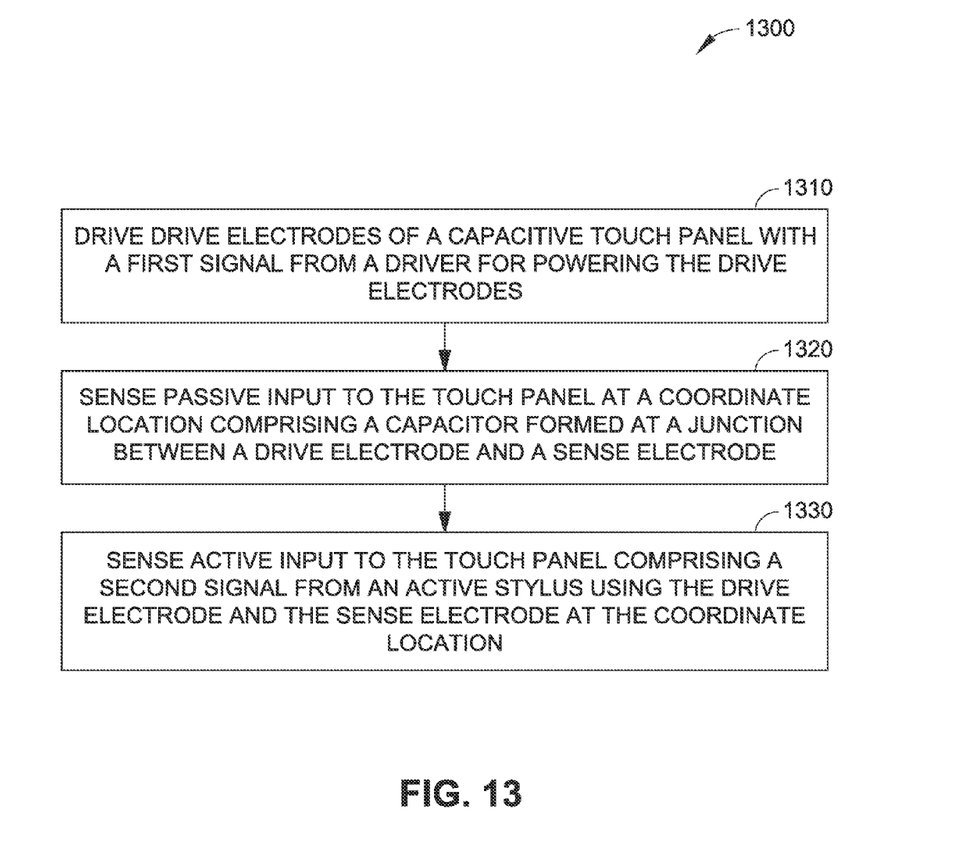
FIG. 13 is a flow diagram illustrating a method for sensing both active and passive input with a single touch panel sensor in accordance with example embodiments of the present disclosure.

Referring now to FIG. 13, example techniques are described for sensing both active and passive input with a single touch panel sensor.

FIG. 13 depicts a process 1300, in an example implementation, for sensing input provided to a capacitive touch panel, such as the capacitive touch panel 100 illustrated in FIGS. 2 through 12 and described above. In the process 1300 illustrated, drive electrodes of a capacitive touch panel are driven with a first signal from a driver configured to power the drive electrodes (Block 1310). For example, with reference to FIGS. 2 through 12, drive electrodes 102 of the capacitive touch panel 100 are driven with the sine signal 118 from the driver 106.

Passive input to the capacitive touch panel is sensed at a coordinate location comprising a capacitor formed at a junction between a drive electrode and a sense electrode (Block 1320). For instance, with continuing reference to FIGS. 2 through 12, finger touch input to the capacitive touch panel 100 is sensed at a coordinate location comprising a capacitor $C_M$ formed at a junction between a drive electrode 102 and a sense electrode 104 (e.g., as shown in FIG. 3).

Active input to the capacitive touch panel comprising a second signal from an active stylus is sensed using the drive electrode and the sense electrode at the coordinate location (Block 1330). For example, with continuing reference to FIGS. 2 through 12, active input to the capacitive touch panel 100 comprising the sine signal 120 from the active stylus 122 is sensed using the drive electrode 102 and/or the sense electrode 104 at a coordinate location comprising a capacitor $C_X$ (e.g., as shown in FIG. 4).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
an active stylus; and
a capacitive touch panel comprising:
   a plurality of sense electrodes arranged next to one another
   a plurality of drive electrodes arranged next to one another across the plurality of sense electrodes, the plurality of drive electrodes and the plurality of sense electrodes defining a coordinate system where each coordinate location comprises a capacitor formed at a junction between one of the plurality of drive electrodes and one of the plurality of sense electrodes, the plurality of drive electrodes configured to receive a first signal from a driver coupled with the plurality of drive electrodes for powering the plurality of drive electrodes to sense passive input to the capacitive touch panel at each coordinate location, and the plurality of drive electrodes and the plurality of sense electrodes configured to receive a second signal from the active stylus to sense active input to the capacitive touch panel at each coordinate location;
   a controller coupled with the plurality of drive electrodes, the controller configured to control the plurality of drive electrodes for sensing both the passive input and the active input; and
   I and Q correlators configured to perform IQ demodulation to eliminate at least one of phase synchronization or frequency synchronization between the second signal transmitted from the active stylus and a demodulation/correlation signal generated by the controller.

2. The system as recited in claim 1, wherein sensing passive input to the capacitive touch panel and sensing active input to the capacitive touch panel is performed at least substantially simultaneously.

3. The system as recited in claim 1, wherein each one of the active stylus and the capacitive touch panel comprises a device configured to generate a stable reference frequency.

4. The system as recited in claim 1, wherein a characteristic frequency of the first signal is at least substantially different from a characteristic frequency of the second signal.

5. The system as recited in claim 1, wherein additional information comprising an indication of at least one of a pressure level or a button press is transmitted via the second signal.

6. A capacitive touch panel comprising:
 a plurality of sense electrodes arranged next to one another;
 a plurality of drive electrodes arranged next to one another across the plurality of sense electrodes, the plurality of drive electrodes and the plurality of sense electrodes defining a coordinate system where each coordinate location comprises a capacitor formed at a junction between one of the plurality of drive electrodes and one of the plurality of sense electrodes, the plurality of drive electrodes configured to receive a first signal from a driver coupled with the plurality of drive electrodes for powering the plurality of drive electrodes to sense passive input to the capacitive touch panel at each coordinate location, and the plurality of drive electrodes and the plurality of sense electrodes configured to receive a second signal from an active stylus to sense active input to the capacitive touch panel at each coordinate location;
 a controller coupled with the plurality of drive electrodes, the controller configured to control the plurality of drive electrodes for sensing both the passive input and the active input; and
 I and Q correlators configured to perform IQ demodulation to eliminate at least one of phase synchronization or frequency synchronization between the second signal transmitted from the active stylus and a demodulation/correlation signal generated by the controller.

7. The capacitive touch panel as recited in claim 6, wherein sensing passive input to the capacitive touch panel and sensing active input to the capacitive touch panel is performed at least substantially simultaneously.

8. The capacitive touch panel as recited in claim 6, wherein each one of the active stylus and the capacitive touch panel comprises a device configured to generate a stable reference frequency.

9. The capacitive touch panel as recited in claim 6, wherein a characteristic frequency of the first signal is at least substantially different from a characteristic frequency of the second signal.

10. The capacitive touch panel as recited in claim 6, wherein additional information comprising an indication of at least one of a pressure level or a button press is transmitted via the second signal.

11. A method, comprising:
 driving a plurality of drive electrodes of a capacitive touch panel with a first signal from a driver coupled with the plurality of drive electrodes for powering the plurality of drive electrodes;
 sensing passive input to the capacitive touch panel at a coordinate location comprising a capacitor formed at a junction between one of the plurality of drive electrodes and one of a plurality of sense electrodes arranged next to one another across the plurality of drive electrodes;
 sensing active input to the capacitive touch panel comprising a second signal from an active stylus using the plurality of drive electrodes and the plurality of sense electrodes at the coordinate location, wherein a controller is coupled with the plurality of drive electrodes and is capable of controlling the plurality of drive electrodes for sensing both the passive input and the active input; and
 using IQ demodulation to eliminate at least one of phase synchronization or frequency synchronization between the second signal transmitted from the active stylus and a demodulation/correlation signal generated by the controller.

12. The method as recited in claim 11, wherein the steps of sensing passive input to the capacitive touch panel and sensing active input to the capacitive touch panel are performed at least substantially simultaneously.

13. The method as recited in claim 11, wherein each one of the active stylus and the capacitive touch panel comprises a device configured to generate a stable reference frequency.

14. The method as recited in claim 11, wherein additional information comprising an indication of at least one of a pressure level or a button press is transmitted via the second signal.

* * * * *